United States Patent [19]
Drake et al.

[11] Patent Number: 6,107,534
[45] Date of Patent: *Aug. 22, 2000

[54] METHOD OF MAKING AN IMPROVED CATALYST CONTAINING AN ACID-TREATED ZEOLITE, A BORON COMPONENT, AND A ZINC COMPONENT, A PRODUCT FROM SUCH METHOD, AND THE USE THEREOF IN THE CONVERSION OF HYDROCARBONS

[75] Inventors: Charles A. Drake, Nowata; An-hsiang Wu, Bartlesville, both of Okla.

[73] Assignee: Phillips Petroleum Company, Bartlesville, Okla.

[ * ] Notice: This patent is subject to a terminal disclaimer.

[21] Appl. No.: 09/384,365

[22] Filed: Aug. 25, 1999

Related U.S. Application Data

[62] Division of application No. 09/040,704, Mar. 18, 1998, Pat. No. 5,981,417.
[51] Int. Cl.$^7$ ..................................................... C07C 15/00
[52] U.S. Cl. ......................... 585/411; 585/407; 585/418; 585/467; 585/654; 585/661; 502/60; 502/64; 502/73; 502/77; 502/85
[58] Field of Search ................................. 502/60, 64, 73, 502/77, 85; 585/407, 411, 418, 467, 654, 661

[56] References Cited

U.S. PATENT DOCUMENTS

| | | | |
|---|---|---|---|
| 4,049,573 | 9/1977 | Keading | 502/77 |
| 4,711,971 | 12/1987 | Chang et al. | 585/415 |
| 4,751,341 | 6/1988 | Rodewald | 585/533 |
| 4,912,073 | 3/1990 | Chu | 502/85 |
| 5,981,417 | 11/1999 | Drake | 502/64 |

*Primary Examiner*—Tom Dunn
*Attorney, Agent, or Firm*—Reece A. Scott

[57] ABSTRACT

An improved zeolite catalyst containing an acid-treated zeolite, a boron component and a zinc component manufactured by a novel method having certain process steps necessary for providing the improved zeolite catalyst. The process steps include a first steam treatment of an acid-treated zeolite, followed by incorporation of such zeolite with a boron component and a zinc component, followed by a second steam treatment. Processes are also disclosed for using the improved zeolite catalyst in the conversion of hydrocarbons, preferably non-aromatic hydrocarbons, to lower olefins (such as ethylene and propylene) and aromatic hydrocarbons (such as benzene, toluene, and xylene).

50 Claims, No Drawings

METHOD OF MAKING AN IMPROVED CATALYST CONTAINING AN ACID-TREATED ZEOLITE, A BORON COMPONENT, AND A ZINC COMPONENT, A PRODUCT FROM SUCH METHOD, AND THE USE THEREOF IN THE CONVERSION OF HYDROCARBONS

This application is a division of application Ser. No. 09/040,704 filed on Mar. 18, 1998, now U.S. Pat. No. 5,981,417.

BACKGROUND OF THE INVENTION

The invention relates to an improved process for converting hydrocarbons, preferably non-aromatic hydrocarbons, in the presence of an improved zeolite material to aromatic hydrocarbons and lower olefin hydrocarbons preferably with a low rate of coke formation during the conversion of such hydrocarbons in the presence of such improved zeolite material.

It is known to catalytically crack gasoline boiling range hydrocarbons (in particular, non-aromatic gasoline boiling range hydrocarbons, more in particular, paraffins and olefins) to lower olefins (such as ethylene and propylene) and aromatic hydrocarbons (such as benzene, toluene, and xylenes, and also ethylbenzene) in the presence of catalysts which contain a zeolite (such as ZSM-5), as is described in an article by N.Y. Chen et al. in Industrial & Engineering Chemistry Process Design and Development, Volume 25, 1986, pages 151–155. The reaction product of this catalytic cracking process contains a multitude of hydrocarbons such as unconverted $C_5+$ alkanes, lower halkanes (methane, ethane, propane), lower alkenes (ethylene and propylene), $C_6$–$C_8$ aromatic hydrocarbons (e.g., benzene, toluene, xylene, and ethylbenzene), and $C_9+$ aromatic hydrocarbons. Depending upon the relative market prices of the individual reaction products, it can be desirable to increase the yield of certain of the more valuable products relative to the others.

One concern with the use of zeolite catalysts in the conversion of hydrocarbons to aromatic hydrocarbons and lower olefins is the excessive production of coke during the conversion reaction. The term "coke" refers to a semi-pure carbon generally deposited on the surface of a metal wall or a catalyst. Coke formed during the zeolite catalyzed aromatization of hydrocarbons tends to cause catalyst deactivation. It is desirable to improve processes for the aromatization of hydrocarbons, and the formation of lower olefins from hydrocarbons, by minimizing the amount of coke formed during such processes. It is also desirable to have a zeolite catalyst that is useful in producing significant quantities of the aromatic and olefin conversion products.

SUMMARY OF THE INVENTION

It is an object of this invention to provide a zeolite-based catalyst used to at least partially convert hydrocarbons to ethylene, propylene and BTX (benzene, toluene, xylene and ethylbenzene) aromatics.

A further object of this invention is to provide an improved process for the conversion of hydrocarbons in which the rate of coke formation during such conversion of hydrocarbons is minimized.

A yet further object of this invention is to provide an improved zeolite material which, when used in the conversion of hydrocarbons, results in less coke formation than alternative zeolite materials.

Another object of this invention is to provide an improved zeolite material that gives an improved yield of lower olefins and BTX aromatics when utilized in the conversion of hydrocarbons.

Yet another object of this invention is to provide hydrocarbon conversion processes which have an acceptably low coke production rate and/or which produce a conversion product containing suitable quantities of olefins and BTX aromatics.

Yet another further object of this invention is to provide a method for making an improved zeolite material having such desirable properties as providing for low coke production and improved yields of lower olefins, with an especially improved ratio of olefins to aromatics in the product, when used in the conversion of hydrocarbons.

The inventive method provides for the conversion of hydrocarbons, preferably non-aromatic hydrocarbons, to aromatic hydrocarbons and lower olefins by contacting, under reaction conditions (i.e., conversion conditions), a hydrocarbon fluid with an incorporated, preferably impregnated, acid-treated zeolite catalyst comprising an acid-treated zeolite, a boron component, and a zinc component by using a specific sequence of process steps to yield the improved acid-treated zeolite catalyst. A zeolite starting material is treated with an acid to form an acid-treated (or acid-leached) zeolite. The acid-treated zeolite undergoes a steam treating step prior to incorporation of a boron component and a zinc component into, onto, or with the steam-treated, acid-treated zeolite. Subsequent to the incorporation of the boron and zinc components into, onto, or with the steam-treated, acid-treated zeolite, a second steam treatment is performed to finally yield the improved zeolite catalyst.

The catalyst prepared by the novel inventive method is used to convert hydrocarbons, preferably non-aromatic hydrocarbons, to, preferably, lower olefins and aromatics by contacting the catalyst under reaction conditions with a hydrocarbon fluid.

Other objects and advantages of the invention will become apparent from the detailed description and the appended claims.

DETAILED DESCRIPTION OF THE INVENTION

It has been discovered that the performance of a catalyst containing an acid-treated zeolite, a boron component, and a zinc component can be improved by utilizing a novel process of making such catalyst. This novel method of making the improved zeolite catalyst containing an acid-treated zeolite, a boron component, and a zinc component uses specific manufacturing steps and sequence of steps to give the improved zeolite catalyst.

The important steps of the novel process of making the catalyst are two steam treating steps. The first steam treating step includes the steam treatment of an acid-treated zeolite prior to incorporation of a boron component and a zinc component into, onto, or with the acid-treated zeolite. The second steam treating step includes a steam treatment subsequent to such incorporation of a boron component and a zinc component into, onto, or with the acid-treated zeolite. The use of the two steam treatment steps in the specifically defined order produces a catalyst containing an acid-treated zeolite, a boron component and a zinc component that provides an improved lower olefin yield and a greater olefin-to-aromatics ratio when used in the conversion of hydrocarbons, preferably non-aromatic hydrocarbons, than a catalyst containing an acid-treated zeolite, a boron component and a zinc component that is made by certain methods other than the inventive method described herein.

To make the improved zeolite catalyst having incorporated therein, thereon, or therewith a boron component and a zinc component, a starting zeolite or zeolite material is first treated with an acid to form an acid-treated zeolite. The zeolite starting material used in the composition of the invention can be any zeolite which is effective in the conversion of hydrocarbons, preferably non-aromatic hydrocarbons, to lower olefin hydrocarbons and aromatic hydrocarbons when contacted under suitable reaction conditions. Examples of suitable zeolites include, but are not limited to, those disclosed in Kirk-Othmer Encyclopedia of Chemical Technology, third edition, volume 15, pages 638–669 (John Wiley & Sons, New York, 1981). Preferably, the zeolite has a constraint index (as defined in U.S. Pat. No. 4,097,367, which is incorporated herein by reference) in the range of from about 0.4 to about 12, preferably in the range of from about 2 to about 9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is in the range of from about 8:1 to about 200:1, more preferably in the range of from about 12:1 to about 100:1. Preferred zeolites include ZSM-5, ZSM-8, ZSM-11, ZSM-12, ZSM-35, ZSM-38, and combinations thereof. Some of these zeolites are also known as "MFI" or "Pentasil" zeolites. The presently more preferred zeolite is ZSM-5.

The zeolite starting material is treated with an acid by any suitable means or method(s) that results in an acid-treated zeolite. Generally, any organic acid, inorganic acid, or combinations thereof can be used in the process of the present invention so long as the acid can reduce the aluminum content in the zeolite. The acid can also be a diluted aqueous acid solution. Examples of possible acids include, but are not limited to, sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids wherein one or more protons have been replaced with, for example, a metal (preferably an alkali metal), and combinations thereof. Examples of partially neutralized acids include, but are not limited to, sodium bisulfate, sodium dihydrogen phosphate, potassium hydrogen tartars, ammonium sulfate, ammonium chloride, ammonium nitrate, and combinations thereof. The presently preferred acid is aqueous hydrochloric acid.

Any method(s) known to one skilled in the art for treating a solid catalyst with an acid can be used in the acid treatment of the present invention. Generally, a zeolite material can be suspended in an acid solution. The concentration of the zeolite in the acid solution can be in the range of from about 0.01 gram per liter to about 500 grams per liter, preferably in the range of from about 0.1 gram per liter to about 400 grams per liter, more preferably in the range of from about 1 gram per liter to about 350 grams per liter, and most preferably in the range from 5 grams per liter to 300 grams per liter. The amount of acid required is the amount that can maintain the solution in acidic pH (i.e., pH less than about 7) during the treatment. Preferably the initial pH of the acid solution containing a zeolite is adjusted to lower than about 6, preferably lower than about 5, more preferably lower than about 4, and most preferably lower than 3. Upon the pH adjustment of the solution, the solution can be subjected to a treatment at a temperature in the range of from about 30° C. to about 200° C., preferably in the range of from about 50° C. to about 150° C., and most preferably in the range from 70° C. to 120° C. for a time period in the range of from about 1 minute to about 30 hours, preferably in the range of from about 10 minutes to about 25 hours, and most preferably in the range from 30 minutes to 20 hours. The treatment can be carried out under a pressure in the range of from about atmospheric to about 150 pounds per square inch absolute (psia), preferably about atmospheric, so long as the desired temperature can be maintained.

Thereafter, the acid-treated zeolite material can be washed with running water for a time period in the range of from about 1 minute to about 60 minutes followed by drying, at a temperature in the range of from about 50° C. to about 1000° C., preferably in the range of from about 75° C. to about 750° C., and most preferably in the range from 100° C. to 650° C. for a time period in the range of from about 0.5 hour to about 15 hours, preferably in the range of from about 1 hour to about 12 hours, and most preferably in the range from 1 hour to 10 hours, to produce an acid-treated zeolite. Any drying method(s) known to one skilled in the art such as, for example, air drying, heat drying, spray drying, fluidized bed drying, or combinations of two or more thereof can be used.

The dried, acid-treated zeolite can also be further washed, if desired, with a mild acid solution such as, for example, ammonium nitrate which is capable of maintaining the pH of the wash solution in acidic range (i.e., a pH of less than about 7). The volume of the acid generally can be the same volume as the acid for reducing the alumina content in a zeolite. The mild acid treatment can be carried out under substantially the same conditions disclosed in the acid treatment for reducing alumina content in a zeolite. Thereafter, the resulting solid can be washed and dried as disclosed above.

The dried, acid-treated zeolite, whether it has been further washed with a mild acid or not, can be calcined, if desired, under a condition known to those skilled in the art. Generally such a condition can include a temperature in the range of from about 250° C. to about 1,000° C., preferably in the range of from about 350° C. to about 750° C., and most preferably in the range from 450° C. to 650° C. and a pressure in the range of from about 7 pounds per square inch absolute (psia) to about 750 psia, preferably in the range of from about 7 psia to about 450 psia, and most preferably in the range from 7 psia to 150 psia for a time period in the range of from about 1 hour to about 30 hours, preferably in the range of from about 2 hours to about 20 hours, and most preferably in the range from 3 hours to 15 hours.

The acid-treated zeolite is then subjected to a first steam treatment whereby it is exposed by any suitable means or method(s) known in the art to an atmosphere of steam under process conditions that suitably provide a steam-treated, acid-treated zeolite. The first steam treatment step is one of two steam treatment steps of the novel method important to the manufacturing of the improved zeolite catalyst containing an acid-treated zeolite, a boron component, and a zinc component. The acid-treated zeolite is exposed to a predominantly gaseous atmosphere, preferably an entirely gaseous atmosphere, comprising steam. The steam atmosphere preferably has a concentration of steam exceeding about 90 molar percent and, most preferably, the concentration of the steam atmosphere exceeds about 95 molar percent.

The first steam treatment may be conducted at any pressure and temperature conditions that suitably provide the first steam-treated, acid-treated zeolite. Generally, the first steam treatment may be conducted at a pressure in the range of from below atmospheric upwardly to about 1000 pounds per square inch absolute (psia). More typical pressures, however, are in the range of from about atmospheric to about 100 psia. The first stream treatment temperature is generally in the range of from about 100° C. to about 1000° C. Preferably, this temperature is in the range of from about 101° C. to about 800° C. and, most preferably, the first steam treatment temperature is in the range from 102° C. to 600° C.

The time period for conducting the first steam treatment step must be sufficient to provide a steam-treated, acid-treated zeolite suitable for incorporating a boron component and a zinc component therein, thereon, or therewith such steam-treated, acid-treated zeolite. Generally, the time period for exposing the acid-treated zeolite to the atmosphere of steam at appropriate temperature conditions can be in the range of from about 0.1 hour to about 30 hours. Preferably, the first steam treatment step is conducted for a time period in the range of from about 0.25 hour to about 25 hours and, most preferably, in the range from 0.5 hour to 20 hours.

Incorporated into, onto, or with the steam-treated, acid-treated zeolite is a boron component and a zinc component to form an incorporated zeolite. The boron and zinc components may be incorporated into, onto, or with the steam-treated, acid-treated zeolite by any suitable means or method(s) known in the art for incorporating elements into, onto, or with a substrate material to form an incorporated zeolite catalyst. A preferred method is the use of any standard incipient wetness impregnation technique (i.e., essentially completely filling the pores of the substrate material with a solution of the incorporating elements) for impregnating the steam-treated, acid-treated zeolite substrate with the boron and zinc components. The preferred method uses an impregnating solution containing the desirable concentrations of a boron component and a zinc component so as to ultimately provide an impregnated zeolite having the required concentration of such method components (boron and zinc components) which can then be subjected to a second steam treatment to produce the final catalyst.

It is particularly desirable to use, for the impregnation of the steam-treated, acid-treated zeolite, aqueous solutions of one, or both, of the boron and zinc components that are incorporated into, onto, or with the steam-treated, acid-treated zeolite. The steam-treated, acid-treated zeolite may be impregnated into, onto, or with the boron component and the zinc component simultaneously, or sequentially, or both, provided the steam-treated, acid-treated zeolite ultimately contains both a boron component and a zinc component.

The preferred impregnating solution may be an aqueous solution formed by dissolving a salt, such as including, but not limited to, a nitrate, a phosphate, a sulfate, or combinations thereof, of a boron component or a zinc component in a solvent, preferably water. The preferred impregnating solution is an aqueous solution formed by dissolving a salt of a boron component (preferably, boric acid) or a salt of a zinc component (preferably, zinc nitrate) in water. It is acceptable to use somewhat of an acidic solution to aid in the dissolution of the salt of the boron component and the salt of the zinc component. It is most preferred for the steam-treated, acid-treated zeolite to be co-impregnated with a boron component and a zinc component by use of an aqueous solution containing a salt of a boron component and a salt of a zinc component.

Examples of a potentially suitable boron component for incorporating, preferably impregnating, into, onto, or with the steam-treated, acid-treated zeolite include, but are not limited to, elemental boron, boric acid, boron bromide, boron carbide, boron fluoride, boron nitride, boron oxide, carborane, N,N-dimethylanilinium tetra(pentafluorophenyl) borate, methyl oxazaborolidine, nitronium tetrafluoroborate, phenylboron dichloride, phenylboron dihydroxide, potassium dodecahydrododecaborate hydrate, potassium tri-sec-butylborohydride, sodium cyanoborohydride, tetrafluoroboric acid, tri-n-amylborate, B-triboromoborazine, tri-n-butylborate, B-trichloroborazine, triethanolamineborate, triethylborate, triethylboron, trimethyoxyboroxine, trimethylborate, trimethylboron, triphenylboron, triphenylboron sodium hydroxide, tris(pentafluorophenyl)boron, tris(trimethylsiloxy)boron, triethylammonium dodecahydrododecaborate, bis(pinacolata)diboron, borane complexes, and combinations thereof. The preferred boron component for incorporating, preferably impregnating, into, onto, or with the steam-treated, acid-treated zeolite is boric acid.

Examples of a potentially suitable zinc component for incorporating, preferably impregnating, into, onto, or with the steam-treated, acid-treated zeolite include, but are not limited to, elemental zinc, zinc nitrate, hydrated zinc nitrate, diethylzinc, dimethylzinc, diphenylzinc, zinc acetate dehydrate, zinc acetylacetonate hydrate, zinc bromide, zinc carbonate hydroxide, zinc chloride, zinc cyclohexanebutyrate dihydrate, zinc 2-ethylhexanoate, zinc 2-ethylhexanoate, zinc fluoride, zinc fluoride tetrahydrate, zinc hexafluoroacetylacetonate dihydrate, zinc iodide, zinc molybdate, zinc naphthenate, zinc nitrate hexahydrate, zinc oxide, zinc perchlorate hexahydrate, zinc phosphate hydrate, zinc phthalocynine, zinc protoporphyrin, zinc selenide, zinc sulfate monohydrate, zinc sulfide, zinc telluride, zinc tetrafluoroborate hydrate, zinc meso-tetraphenylprophine, zinc titanate, zinc trifluoromethanesulfonate, and combinations thereof The preferred zinc component for incorporating, preferably impregnating, into, onto, or with the steam-treated, acid-treated zeolite is zinc nitrate.

The amounts of boron component and zinc component incorporated, preferably impregnated, into, onto, or with the steam-treated, acid-treated zeolite should be such as to give concentrations effective in providing the desirable properties of favorable (i.e., greater) olefin conversion yields, favorable (i.e., greater) olefins-to-aromatics ratio, and low coke production when the improved zeolite catalyst, as manufactured by the method described herein, is employed in the conversion of hydrocarbons, preferably non-aromatic hydrocarbons. Generally, the amount of boron component and zinc component incorporated, preferably impregnated, into, onto, or with the steam-treated, acid-treated zeolite is such that the atomic ratio of boron to zinc in the final improved zeolite catalyst is in the range of from about 0.1:1 to about 10:1. A preferred atomic ratio of boron to zinc in the final improved zeolite catalyst is in the range of from about 0.2:1 to about 6:1 and, most preferably, the atomic ratio of boron to zinc is in the range from 0.5:1 to 5:1.

Generally, the amount of boron component incorporated, preferably impregnated, into, onto, or with the steam-treated, acid-treated zeolite is such that the weight percent of boron present in the final improved zeolite catalyst is generally in the range upwardly to about 15 weight percent of the total weight of the final improved zeolite catalyst. The preferred concentration of the boron component in the final improved zeolite catalyst is in the range of from about 0.1 weight percent of the total weight of the final improved zeolite catalyst to about 12 weight percent of the total weight of the final improved zeolite catalyst and, most preferably, in the range from 0.2 weight percent to 10 weight percent.

Generally, the amount of zinc component incorporated, preferably impregnated, into, onto, or with the steam-treated, acid-treated zeolite is such that the weight percent of zinc present in the final improved zeolite catalyst is generally in the range upwardly to about 10 weight percent of the total weight of the final improved zeolite catalyst. The preferred concentration of the zinc component in the final improved zeolite catalyst is in the range of from about 0.05 weight percent of the total weight of the final improved zeolite catalyst to about 8 weight percent of the total weight of the final improved zeolite catalyst and, most preferably, in the range from 0.1 weight percent to 6 weight percent.

The incorporated, preferably impregnated, zeolite catalyst is then subjected to a second steam treatment whereby it is exposed, by any suitable method(s) known in the art, to an atmosphere of steam under process conditions that suitably provide the final improved zeolite catalyst for use in converting hydrocarbons, preferably for use in converting non-aromatic hydrocarbons. The steam treatment of the incorporated, preferably impregnated, zeolite, i.e., subsequent to incorporation of the boron component and the zinc component into, onto, or with the steam-treated, acid-treated zeolite, is important, as earlier indicated, to the manufacture of the improved zeolite catalyst.

During the second steam treatment, the incorporated, preferably impregnated, zeolite is exposed to a predominantly gaseous atmosphere, preferably an entirely gaseous atmosphere, comprising steam. Preferably, the steam atmosphere has a steam concentration exceeding about 90 molar percent steam and, most preferably, the steam atmosphere has a steam concentration exceeding about 95 molar percent steam. Generally, the second steam treatment may be conducted at a pressure in the range of from below atmospheric upwardly to about 1000 pounds per square inch absolute (psia). More typical pressures, however, are in the range of from about atmospheric to about 100 psia. The second steam treatment temperature is generally in the range of from about 100° C. to about 1000° C. Preferably, this temperature is in the range of from about 101° C. to about 800° C. and, most preferably, the second stream treatment temperature is in the range from 102° C. to 600° C.

The time period for conducting the second steam treatment step must be sufficient to provide a suitably treated catalyst having the desired properties. Generally, the time period of the second steam treatment step for exposing the incorporated zeolite, preferably impregnated zeolite, to the atmosphere of steam at appropriate temperature conditions, can be in the range of from about 0.1 hour to about 30 hours. Preferably, the second steam treatment step is conducted for a time period in the range of from about 0.25 hour to about 25 hours and, most preferably, in the range from 0.5 hour to 20 hours.

The improved zeolite catalyst compositions described herein can also contain an inorganic binder (also called matrix material) preferably selected from the group consisting of alumina, silica, alumina-silica, aluminum phosphate, clays (such as bentonite), and combinations thereof. The content of the incorporated zeolite component of the optional mixture, of incorporated zeolite component and inorganic binder, is in the range of from about 1 weight percent of the total weight of the optional mixture to about 99 weight percent of the total weight of the optional mixture. Preferably, the content of the incorporated zeolite component of the optional mixture is in the range of from about 5 weight percent of the total weight of the optional mixture to about 80 weight percent of the total weight of the optional mixture.

Generally, the incorporated zeolite and inorganic binder components are compounded and subsequently shaped (such as by pelletizing, extruding or tableting) into a compounded composition. Generally, the surface area of the compounded composition is in the range of from about 50 m$^2$/g to about 700 m$^2$/g. Generally, the particle size of the compounded composition is in the range of from about 1 mm to about 10 mm.

Any suitable hydrocarbon fluid which comprises paraffins (alkanes) and/or olefins (alkenes) and/or naphthenes (cycloalkanes), wherein each of these hydrocarbons contains in the range of from about 2 to about 16 carbon atoms per molecule, can be used as the fluid to be contacted with the improved zeolite catalyst under suitable process conditions for obtaining a reaction product comprising lower olefins (alkenes, such as ethylene and propylene) containing in the range of from about 2 to about 5 carbon atoms per molecule and aromatic hydrocarbons (such as BTX, i.e., benzene, toluene, and xylene). Frequently, the suitable hydrocarbon fluid also contains aromatic hydrocarbons. The term "fluid" is used herein to denote gas, liquid, vapor, or combinations thereof.

Non-limiting examples of suitable, available hydrocarbon fluid include gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and combinations thereof. Though the particular composition of the fluid is not critical, the preferred hydrocarbon fluid is a gasoline-boiling range hydrocarbon fluid suitable for use as at least a gasoline blend stock generally having a boiling range of about 30° C. to about 210° C. Generally, the content of paraffins exceeds the combined content of olefins, naphthenes and aromatics (if present).

The hydrocarbon fluid can be contacted by any suitable means, method(s), or manner with the improved zeolite catalyst composition, described herein, contained within a reaction zone. The contacting step can be operated as a batch process step or, preferably, as a continuous process step. In the latter operation, a solid catalyst bed, or a moving catalyst bed, or a fluidized catalyst bed can be employed. Any of these operational modes have advantages and disadvantages, and those skilled in the art can select the one most suitable for a particular fluid and catalyst.

The contacting step is preferably carried out within a conversion reaction zone, wherein is contained the improved zeolite catalyst composition, and under reaction conditions, i.e., conversion conditions, that suitably promote the formation of olefins, preferably light olefins, and aromatics, preferably BTX, from at least a portion of the hydrocarbons of the hydrocarbon fluid. Thus, the reaction product, i.e., the conversion product, includes olefins and aromatics.

Reaction, or conversion, conditions would include a reaction temperature of the contacting step preferably in the range of from about 400° C. to about 800° C., more preferably in the range of from about 450° C. to about 750° C. and, most preferably in the range from 500° C. to 700° C. The contacting pressure can be in the range of from below atmospheric pressure upwardly to about 500 pounds per square inch absolute (psia), preferably, from about atmospheric to about 450 psia and, most preferably, from 20 psia to 400 psia.

The flow rate at which the hydrocarbon fluid is charged (i.e., the charge rate of hydrocarbon fluid) to the conversion reaction zone is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon fluid is charged to the conversion reaction zone in pounds per hour divided by the pounds of catalyst contained in the conversion reaction zone to which the hydrocarbon fluid is charged. The preferred WHSV of the hydrocarbon fluid to the conversion reaction zone or contacting zone can be in the range of from about 0.25 hour$^{-1}$ to about 250 hour$^{-1}$ and, most preferably in the range from 0.5 hour$^{-1}$ to 100 hour$^{-1}$.

The process effluent, from the conversion reaction zone or contacting zone, generally contains: a light gas fraction comprising hydrogen and methane, a $C_2$–$C_3$ fraction containing ethylene, propylene, ethane, and propane, an intermediate fraction including non-aromatic compounds having greater than 3 carbon atoms, a BTX aromatic hydrocarbons fraction (benzene, toluene, ortho-xylene, meta-xylene and para-xylene), and a $C_9+$ fraction which contains aromatic compounds having 9 or more carbon atoms per molecule.

Generally, the process effluent can be separated into these principal fractions by any known method(s) such as, for example, fractionation distillation. Because the separation method(s) are well known to one skilled in the art, the description of such separation method(s) is omitted herein. The intermediate fraction can be fed to an aromatization reactor to be converted to aromatic hydrocarbons. The methane, ethane, and propane can be used as fuel gas or as a feed for other reactions such as, for example, in a thermal cracking process to produce ethylene and propylene. The olefins can be recovered and further separated into individual olefins by any method(s) known to one skilled in the art. The individual olefins can then be recovered and marketed. The BTX fraction can be further separated into individual $C_6$ to $C_8$ aromatic hydrocarbon fractions. Alternatively, the BTX fraction can further undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the improved zeolite catalyst composition has been deactivated by, for example, coke deposition or feed poisons, to an extent that the feed conversion and/or the selectivity to the desired ratios of olefins to BTX has become unsatisfactory, the improved zeolite catalyst composition can be reactivated by any means or method(s) known to one skilled in the art such as, for example, calcining in air to burn off deposited coke and other carbonaceous materials, such as oligomers or polymers, preferably at a temperature in the range of from about 400° C. to about 1000° C. The optimal time periods of the calcining depend generally on the types and amounts of deactivating deposits on the catalyst composition and on the calcination temperatures. These optimal time periods can easily be determined by those possessing ordinary skill(s) in the art and are omitted herein for the interest of brevity.

The following examples are presented to further illustrate this invention and are not to be construed as unduly limiting its scope.

EXAMPLE I

This example illustrates the preparation of several catalysts which were subsequently tested as catalysts in the conversion of a gasoline fluid sample to lower olefins (such as, ethylene and propylene) and aromatics (such as, BTX). The gasoline sample had been produced in a commercial fluidized catalytic cracking unit (FCC).

Acid-Treated ZSM-5 Zeolite Catalyst

A commercially available ZSM-5 zeolite catalyst (provided by United Catalysts Inc., Louisville, Ky., under product designation "T-4480" obtained as $\frac{1}{16}$ inch extrudate) was treated with acid. To treat the catalyst with acid, the catalyst was soaked in an aqueous hydrochloric acid (HCl) solution, having a concentration of 38 weight percent HCl (approximately 6N), for two hours at a constant temperature of about 90° C. After soaking, the catalyst was separated from the acid solution and thoroughly washed with water and dried. The acid-soaked, washed, and dried catalyst was calcined at a temperature of about 525° C. for four hours.

Catalyst A (Control)

A 10.0 gram quantity of the above-described, acid-treated ZSM-5 zeolite catalyst (commercially available "T-4480" treated with acid, as described above) was impregnated, by an incipient wetness impregnation technique (i.e., essentially completely filling the pores of the substrate material with a solution of the incorporating elements), with a solution containing 0.54 grams of hydrated zinc nitrate ($Zn(NO_3)_2.6H_2O$), 0.45 grams of boric acid ($H_3BO_3$), and 8.55 grams of deionized water. This impregnated, acid-treated zeolite was then treated in a steam atmosphere for 6 hours at 650° C. with a $H_2O$ flow rate of 20 ml/hr and a helium flow rate of 500 cc/min. A final product weighing 10.06 grams was obtained. The final product contained a boron (B) concentration of 0.782 percent of the total weight of the final product (i.e., 0.782 weight percent B). The final product also contained a zinc (Zn) concentration of 1.180 percent of the total weight of the final product (i.e., 1.180 weight percent Zn). The final product had an atomic ratio of boron to zinc of 4:1.

Catalyst B (Invention)

A 50.0 gram quantity of above-described, acid-treated ZSM-5 zeolite catalyst (commercially available "T-4480" treated with acid, as described above) was treated with a first steam treatment in a steam atmosphere for 8 hours at 650° C. with a $H_2O$ flow rate of 20 ml/hr and a helium flow rate of 500 cc/min. A 10.0 gram quantity of the resulting steam-treated, acid-treated zeolite was then impregnated, by an incipient wetness impregnation technique (i.e., essentially completely filling the pores of the substrate material with a solution of the incorporating elements), with a solution containing 0.50 grams of hydrated zinc nitrate ($Zn(NO_3)_2.6H_2O$), 0.40 grams of boric acid ($H_3BO_3$), and 7.60 grams of deionized water. This impregnated, steam-treated, acid-treated zeolite was then treated with a second steam treatment in a steam atmosphere for 6 hours at 650° C. with a $H_2O$ flow rate of 20 ml/hr and a helium flow rate of 500 cc/min. A final product weighing 10.23 grams was obtained. The final product contained a boron (B) concentration of 0.720 percent of the total weight of the final product (i.e., 0.720 weight percent B). The final product also contained a zinc (Zn) concentration of 1.074 percent of the total weight of the final product (i.e., 1.074 weight percent Zn). The final product had an atomic ratio of boron to zinc of 4:1.

EXAMPLE II

This example illustrates the use of the catalysts described in Example I as catalysts in the conversion of a gasoline fluid to lower olefins (such as, ethylene and propylene) and aromatics (such as, BTX).

For each of the test runs, a 5.0 g sample, of the catalyst materials described in Example I, was placed into a stainless steel tube reactor (length: about 18 inches; inner diameter: about 0.5 inch). Gasoline boiling range fluid from a catalytic cracking unit of a refinery was passed through the reactor at a flow rate of about 14 ml/hour, at a temperature of about 600° C., and at atmospheric pressure (about 0 pounds per square inch gauge). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Results of test runs for Catalyst A (Control) and Catalyst B (Invention) are summarized in Table I. All test data were obtained after 8 hours on stream.

TABLE I

| Catalyst | BTX Yield (wt %) | Light Olefin* Yield (wt %) | Sum of BTX and Olefin | Olefin/BTX Ratio | Avg wt % Coke/hr** |
|---|---|---|---|---|---|
| A (Control) | 41 | 20.3 | 61.3 | 0.50 | 0.40 |
| B (Invention) | 37 | 22.9 | 59.9 | 0.62 | 0.32 |

*Ethylene and Propylene
**Coke was determined at the end of the reaction by removing the catalysts from the reactor and measuring the coke with a thermal gravimetric analyzer (TGA), manufactured by TA Instruments, New Castle, Delaware.

The test data presented in Table I clearly show that Catalyst B (Invention) exhibited considerably less coking than Catalyst A (Control). Invention Catalyst B also exhibited an improved (i.e., greater) Olefin/BTX ratio when compared to Control Catalyst A. Invention Catalyst B also exhibited a sum of BTX and Olefin similar to Control Catalyst A. The improvement in catalyst performance is believed to be due to the novel process of making the invention catalyst by the novel process of a first steam treatment of an acid-treated zeolite, followed by incorporation of such zeolite with a boron component and a zinc component, followed by a second steam treatment.

The results shown in the above example clearly demonstrate that the present invention is well adapted to carry out the objects and attain the ends and advantages mentioned as well as those inherent therein. Reasonable variations, modifications, and adaptations can be made within the scope of the disclosure and the appended claims without departing from the scope of this invention.

What is claimed is:

1. A catalyst that provides an improved lower olefin yield and a greater olefin-to-aromatics ratio when used in the conversion of hydrocarbons prepared by a process comprising:
    (a) treating a zeolite with an acid to form an acid-treated zeolite,
    (b) steam treating said acid-treated zeolite to form a steam-treated, acid-treated zeolite,
    (c) incorporating a boron component and a zinc component with said steam-treated, acid-treated zeolite to form an incorporated zeolite, and
    (d) steam treating said incorporated zeolite to thereby form said catalyst.

2. A catalyst according to claim 1, wherein the amount of said boron component and said zinc component incorporated with said steam-treated, acid-treated zeolite is such as to provide an atomic ratio of boron to zinc in said catalyst in the range of from about 0.1:1 to about 10:1.

3. A catalyst according to claim 2, wherein the amount of said boron component incorporated with said steam-treated, acid-treated zeolite is such as to provide a concentration of boron in said catalyst in the range upwardly to about 15 weight percent of the total weight of said catalyst.

4. A catalyst according to claim 3, wherein the amount of said zinc component incorporated with said steam-treated, acid-treated zeolite is such as to provide a concentration of zinc in said catalyst in the range upwardly to about 10 weight percent of the total weight of said catalyst.

5. A catalyst according to claim 4, wherein said incorporating step (c) comprises impregnating said steam-treated, acid-treated zeolite with an impregnating solution containing said boron component and said zinc component.

6. A catalyst according to claim 5, wherein said boron component is selected from the group consisting of elemental boron, boric acid, boron bromide, boron carbide, boron fluoride, boron nitride, boron oxide, carborane, N,N-dimnethylanilinium tetra(pentafluorophenyl)borate, methyl oxazaborolidine, nitronium tetrafluoroborate, phenylboron dichloride, phenylboron dihydroxide, potassium dodecahydrododecaborate hydrate, potassium tri-sec-butylborohydride, sodium cyanoborohydride, tetrafluoroboric acid, tri-n-amylborate, B-triboromoborazine, tri-n-butylborate, B-trichloroborazine, triethanolamineborate, triethylborate, triethylboron, trimethyoxyboroxine, trimethylborate, trimethylboron, triphenylboron, triphenylboron sodium hydroxide, tris(pentafluorophenyl)boron, tris(trimethylsiloxy)boron, triethylammonium dodecahydrododecaborate, bis(pinacolata)diboron, borane complexes, and combinations thereof.

7. A catalyst according to claim 6, wherein said boron component is boric acid.

8. A catalyst according to claim 7, wherein said zinc component is selected from the group consisting of elemental zinc, zinc nitrate, hydrated zinc nitrate, diethylzinc, dimethylzinc, diphenylzinc, zinc acetate dehydrate, zinc acetylacetonate hydrate, zinc bromide, zinc carbonate hydroxide, zinc chloride, zinc cyclohexanebutyrate dihydrate, zinc 2-ethylhexanoate, zinc fluoride, zinc fluoride tetrahydrate, zinc hexafluoroacetylacetonate dihydrate, zinc iodide, zinc molybdate, zinc naphthenate, zinc nitrate hexahydrate, zinc oxide, zinc perchlorate hexahydrate, zinc phosphate hydrate, zinc phthalocynine, zinc protoporphyrin, zinc selenide, zinc sulfate monohydrate, zinc sulfide, zinc telluride, zinc tetrafluoroborate hydrate, zinc meso-tetraphenylprophine, zinc titanate, zinc trifluoromethanesulfonate, and combinations thereof.

9. A catalyst according to claim 8, wherein said zinc component is zinc nitrate.

10. A catalyst according to claim 9, wherein said treating step (a) comprises contacting said zeolite with said acid selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids and combinations thereof.

11. A catalyst according to claim 10, wherein said acid is hydrochloric acid.

12. A catalyst according to claim 11, wherein said zeolite is selected from the group consisting of ZSM-5, ZSM-8, ZSM-11, ZSM-12, ZSM-35, ZSM-38, and combinations thereof.

13. A catalyst according to claim 12, wherein said zeolite is ZSM-5.

14. A catalyst according to claim 13, wherein said steam treating step (b) comprises exposing said acid-treated zeolite to a steam atmosphere having a concentration of steam exceeding about 90 molar percent, a pressure in the range of from below atmospheric upwardly to about 1000 pounds per square inch absolute, a temperature in the range of from about 100° C. to about 1000° C., and a time period in the range of from about 0.1 hour to about 30 hours.

15. A catalyst according to claim 14, wherein said steam treating step (d) comprises exposing said incorporated zeolite to a steam atmosphere having a concentration of steam exceeding about 90 molar percent, a pressure in the range of from below atmospheric upwardly to about 1000 pounds per square inch absolute, a temperature in the range of from about 100° C. to about 1000° C., and a time period in the range of from about 0.1 hour to about 30 hours.

16. A process of using a catalyst that provides an improved lower olefin yield and a greater olefin-to-aromatics ratio when used in the conversion of hydrocarbons comprising contacting, under reaction conditions, a hydrocarbon fluid with said catalyst, wherein a reaction product includes olefins and aromatics, and further wherein said catalyst is prepared by a process comprising (a) treating a zeolite with an acid to form an acid-treated zeolite, (b) steam treating said acid-treated zeolite to form a steam-treated, acid-treated zeolite, (c) incorporating a boron component and a zinc component with said steam-treated, acid-treated zeolite to form an incorporated zeolite, and (d) steam treating said incorporated zeolite to thereby form said catalyst.

17. A process according to claim 16, wherein the amount of said boron component and said zinc component incorporated with said steam-treated, acid-treated zeolite is such as to provide an atomic ratio of boron to zinc in said catalyst in the range of from about 0.1:1 to about 10:1.

18. A process according to claim 17, wherein the amount of said boron component incorporated with said steam-treated, acid-treated zeolite is such as to provide a concentration of boron in said catalyst in the range upwardly to about 15 weight percent of the total weight of said catalyst.

19. A process according to claim 18, wherein the amount of said zinc component incorporated with said steam-treated, acid-treated zeolite is such as to provide a concentration of zinc in said catalyst in the range upwardly to about 10 weight percent of the total weight of said catalyst.

20. A process according to claim 19, wherein said incorporating step (c) comprises impregnating said steam-treated, acid-treated zeolite with an impregnating solution containing said boron component and said zinc component.

21. A process according to claim 20, wherein said boron component is selected from the group consisting of elemental boron, boric acid, boron bromide, boron carbide, boron fluoride, boron nitride, boron oxide, carborane, N,N-dimethylanilinium tetra(pentafluorophenyl)borate, methyl oxazaborolidine, nitronium tetrafluoroborate, phenylboron dichloride, phenylboron dihydroxide, potassium dodecahydrododecaborate hydrate, potassium tri-sec-butylborohydride, sodium cyanoborohydride, tetrafluoroboric acid, tri-n-amylborate, B-triboromoborazine, tri-n-butylborate, B-trichloroborazine, triethanolamineborate, triethylborate, triethylboron, trimethyoxyboroxine, trimethylborate, trimethylboron, triphenylboron, triphenyl- boron sodium hydroxide, tris(pentafluorophenyl)boron, tris(trimethylsiloxy)boron, triethylammonium dodecahydrododecaborate, bis(pinacolata)diboron, borane complexes, and combinations thereof.

22. A process according to claim 21, wherein said boron component is boric acid.

23. A process according to claim 22, wherein said zinc component is selected from the group consisting of elemental zinc, zinc nitrate, hydrated zinc nitrate, diethylzinc, dimethylzinc, diphenylzinc, zinc acetate dehydrate, zinc acetylacetonate hydrate, zinc bromide, zinc carbonate hydroxide, zinc chloride, zinc cyclohexanebutyrate dihydrate, zinc 2-ethylhexanoate, zinc fluoride, zinc fluoride tetrahydrate, zinc hexafluoroacetylacetonate dihydrate, zinc iodide, zinc molybdate, zinc naphthenate, zinc nitrate hexahydrate, zinc oxide, zinc perchlorate hexahydrate, zinc phosphate hydrate, zinc phthalocynine, zinc protoporphyrin, zinc selenide, zinc sulfate monohydrate, zinc sulfide, zinc telluride, zinc tetrafluoroborate hydrate, zinc meso-tetraphenylprophine, zinc titanate, zinc trifluoromethanesulfonate, and combinations thereof.

24. A process according to claim 23, wherein said zinc component is zinc nitrate.

25. A process according to claim 24, wherein said treating step (a) comprises contacting said zeolite with said acid selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids and combinations thereof.

26. A process according to claim 25, wherein said acid is hydrochloric acid.

27. A process according to claim 26, wherein said zeolite is selected from the group consisting of ZSM-5, ZSM-8, ZSM-11, ZSM-12, ZSM-35, ZSM-38, and combinations thereof.

28. A process according to claim 27, wherein said zeolite is ZSM-5.

29. A process according to claim 28, wherein said steam treating step (b) comprises exposing said acid-treated zeolite to a steam atmosphere having a concentration of steam exceeding about 90 molar percent, a pressure in the range of from below atmospheric upwardly to about 1000 pounds per square inch absolute, a temperature in the range of from about 100° C. to about 1000° C., and a time period in the range of from about 0.1 hour to about 30 hours.

30. A process according to claim 29, wherein said steam treating step (d) comprises exposing said incorporated zeolite to a steam atmosphere having a concentration of steam exceeding about 90 molar percent, a pressure in the range of from below atmospheric upwardly to about 1000 pounds per square inch absolute, a temperature in the range of from about 100° C. to about 1000° C., and a time period in the range of from about 0.1 hour to about 30 hours.

31. A process according to claim 30, wherein said fluid is selected from the group consisting of gasolines from catalytic oil cracking processes, pyrolysis gasolines from thermal hydrocarboncracking processes, naphthas, gas oils, reformates, straight-run gasoline and combinations thereof.

32. A process according to claim 31, wherein said hydrocarbon contains in the range of from about 2 to about 16 carbon atoms per molecule.

33. A process according to claim 32, wherein said reaction conditions comprise a temperature in the range of from about 400° C. to about 800° C., a pressure in the range of from below atmospheric pressure upwardly to about 500 psia, and a charge rate of said hydrocarbon fluid such that the weight hourly space velocity is in the range of from exceeding 0 hour$^{-1}$ upwardly to about 1000 hour$^{-1}$.

34. A process of using a catalyst that provides an improved lower olefin yield and a greater olefin-to-aromatics ratio when used in the conversion of hydrocarbons comprising contacting, under reaction conditions, a fluid selected from the group consisting of gasolines from catalytic oil cracking processes, pyrolysis gasolines from thermal hydrocarboncracking processes, straight-run gasoline and combinations thereof with said catalyst, wherein a reaction product includes olefins and aromatics, and further wherein said catalyst is prepared by a process comprising:

(a) treating a zeolite with an acid to form an acid-treated zeolite, (b) steam treating said acid-treated zeolite to form a steam-treated, acid-treated zeolite, (c) incorporating a boron component and a zinc component with said steam-treated, acid-treated zeolite to form an incorporated zeolite, and (d) steam treating said incorporated zeolite to thereby form said catalyst.

35. A process according to claim 34 wherein said fluid is a gasoline from a catalytic oil cracking process.

36. A process according to claim 34, wherein the amount of said boron component and said zinc component incorporated with said steam-treated, acid-treated zeolite is such as to provide an atomic ratio of boron to zinc in said catalyst in the range of from about 0.1:1 to about 10:1.

37. A process according to claim 36, wherein the amount of said boron component incorporated with said steam-treated, acid-treated zeolite is such as to provide a concentration of boron in said catalyst in the range upwardly to about 15 weight percent of the total weight of said catalyst.

38. A process according to claim 37, wherein the amount of said zinc component incorporated with said steam-treated, acid-treated zeolite is such as to provide a concentration of zinc in said catalyst in the range upwardly to about 10 weight percent of the total weight of said catalyst.

39. A process according to claim 38, wherein said incorporating step (c) comprises impregnating said steam-treated, acid-treated zeolite with an impregnating solution containing said boron component and said zinc component.

40. A process according to claim 39, wherein said boron component is selected from the group consisting of elemental boron, boric acid, boron bromide, boron carbide, boron fluoride, boron nitride, boron oxide, carborane, N,N-dimethylanilinium tetra(pentafluorophenyl)borate, methyl oxazaborolidine, nitronium tetrafluoroborate, phenylboron dichloride, phenylboron dihydroxide, potassium dodecahydrododecaborate hydrate, potassium tri-sec-butylborohydride, sodium cyanoborohydride, tetrafluoroboric acid, tri-n-amylborate, B-triboromoborazine, tri-n-butylborate, B-trichloroborazine, triethanolamineborate, triethylborate, triethylboron, trimethyoxyboroxine, trimethylborate, trimethylboron, triphenylboron, triphenylboron sodium hydroxide, tris(pentafluorophenyl)boron, tris (trimethylsiloxy)boron, triethylammomum dodecahydrododecaborate, bis(pinacolata)diboron, borane complexes, and combinations thereof.

41. A process according to claim 40, wherein said boron component is boric acid.

42. A process according to claim 41, wherein said zinc component is selected from the group consisting of elemental zinc, zinc nitrate, hydrated zinc nitrate, diethylzinc, dimethylzinc, diphenylzinc, zinc acetate dehydrate, zinc acetylacetonate hydrate, zinc bromide, zinc carbonate hydroxide, zinc chloride, zinc cyclohexanebutyrate dihydrate, zinc 2-ethylhexanoate, zinc fluoride, zinc fluoride tetrahydrate, zinc hexafluoroacetylacetonate dihydrate, zinc iodide, zinc molybdate, zinc naphthenate, zinc nitrate hexahydrate, zinc oxide, zinc perchlorate hexahydrate, zinc phosphate hydrate, zinc phthalocynine, zinc protoporphyrin, zinc selenide, zinc sulfate monohydrate, zinc sulfide, zinc telluride, zinc tetrafluoroborate hydrate, zinc meso-tetraphenylprophine, zinc titanate, zinc trifluoromethanesulfonate, and combinations thereof.

43. A process according to claim 42, wherein said zinc component is zinc nitrate.

44. A process according to claim 43, wherein said treating step (a) comprises contacting said zeolite with said acid selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids and combinations thereof.

45. A process according to claim 44, wherein said acid is hydrochloric acid.

46. A process according to claim 45, wherein said zeolite is selected from the group consisting of ZSM-5, ZSM-8, ZSM-11, ZSM-12, ZSM-35, ZSM-38, and combinations thereof.

47. A process according to claim 46, wherein said zeolite is ZSM-5.

48. A process according to claim 47, wherein said steam treating step (b) comprises exposing said acid-treated zeolite to a steam atmosphere having a concentration of steam exceeding about 90 molar percent, a pressure in the range of from below atmospheric upwardly to about 1000 pounds per square inch absolute, a temperature in the range of from about 100° C. to about 1000° C., and a time period in the range of from about 0.1 hour to about 30 hours.

49. A process according to claim 48, wherein said steam treating step (d) comprises exposing said incorporated zeolite to a steam atmosphere having a concentration of steam exceeding about 90 molar percent, a pressure in the range of from below atmospheric upwardly to about 1000 pounds per square inch absolute, a temperature in the range of from about 100° C. to about 1000° C., and a time period in the range of from about 0.1 hour to about 30 hours.

50. A process according to claim 49, wherein said reaction conditions comprise a temperature in the range of from about 400° C. to about 800° C., a pressure in the range of from below atmospheric pressure upwardly to about 500 psia, and a charge rate of said hydrocarbon fluid such that the weight hourly space velocity is in the range of from exceeding 0 hour$^{-1}$ upwardly to about 1000 hour$^{-1}$.

\* \* \* \* \*

UNITED STATES PATENT AND TRADEMARK OFFICE
CERTIFICATE OF CORRECTION

PATENT NO. : 6,107,534
DATED : August 22, 2000
INVENTOR(S) : Charles A. Drake and An-hsiang Wu It is certified that error appears in the above-identified patent and that said Letters Patent is hereby corrected as shown below:

Column 12, lines 16-17, "N,N-dimnethylanilinium" should be ---N,N-dimethylanilinium---.

Column 15, line 65, "triethylammomum" should be ---triethylammonium---.

Signed and Sealed this

Twenty-ninth Day of May, 2001

Attest:

NICHOLAS P. GODICI

*Attesting Officer*     *Acting Director of the United States Patent and Trademark Office*